United States Patent
Zhao

(10) Patent No.: US 9,659,134 B2
(45) Date of Patent: May 23, 2017

(54) COMPUTING DEVICE AND METHOD FOR DETERMINING WIRING PATHS ON PRINTED CIRCUIT BOARD

(71) Applicants: HONGFUJIN PRECISION ELECTRONICS (ZHENGZHOU) CO.,LTD., Zhengzhou (CN); HON HAI PRECISION INDUSTRY CO., LTD., New Taipei (TW)

(72) Inventor: Jian-Ye Zhao, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 14/791,663

(22) Filed: Jul. 6, 2015

(65) Prior Publication Data

US 2016/0350467 A1    Dec. 1, 2016

(30) Foreign Application Priority Data

Jun. 1, 2015    (CN) .......................... 2015 1 0291243

(51) Int. Cl.
*G06F 17/50*    (2006.01)

(52) U.S. Cl.
CPC ...... *G06F 17/5077* (2013.01); *G06F 17/5068* (2013.01)

(58) Field of Classification Search
CPC ............. G06F 17/5045; G06F 17/5068; G06F 17/5077; G06F 17/5081
USPC ................................ 716/110, 118, 126, 137
See application file for complete search history.

(56) References Cited

U.S. PATENT DOCUMENTS

2008/0244498 A1* 10/2008 Gupta .................. G06F 17/505
716/137

* cited by examiner

*Primary Examiner* — Paul Dinh
(74) *Attorney, Agent, or Firm* — Steven Reiss

(57) ABSTRACT

A printed circuit board (PCB) layout method executed in a computing device obtains pins of a first electronic component that are connected to a second electronic component or third electronic components included in a T topology circuit. A model of the first electronic component is created according to the obtained pins and is modified to form extended nets of the first electronic component. Pin pairs and match groups are set. Wiring paths of the T topology circuit are determined according to the match groups. The wiring paths are output to an output device.

12 Claims, 4 Drawing Sheets

COMPUTING DEVICE AND METHOD FOR DETERMINING WIRING PATHS ON PRINTED CIRCUIT BOARD

CROSS-REFERENCE TO RELATED APPLICATIONS

This application claims priority to Chinese Patent Application No. 201510291243.X filed on Jun. 1, 2015, the contents of which are incorporated by reference herein.

FIELD

The subject matter herein generally relates to printed circuit board (PCB) design.

BACKGROUND

A mobile industry processor interface (MIPI) switch can be used in a mobile phone to connect a central processing unit (CPU) with two cameras via a T topology. There are multiple differential signal pairs between the CPU and the cameras. For each differential signal pair, wiring lengths of the differential signal pair need to be equal. Additionally, for different differential signal pairs, wiring lengths of the different differential signal pairs need to be equal. Therefore, in PCB design, it is difficult and time-consuming to determine wiring paths of the differential signal pairs on a PCB.

BRIEF DESCRIPTION OF THE DRAWINGS

Implementations of the present technology will now be described, by way of example only, with reference to the attached figures.

DETAILED DESCRIPTION

Figure 1:
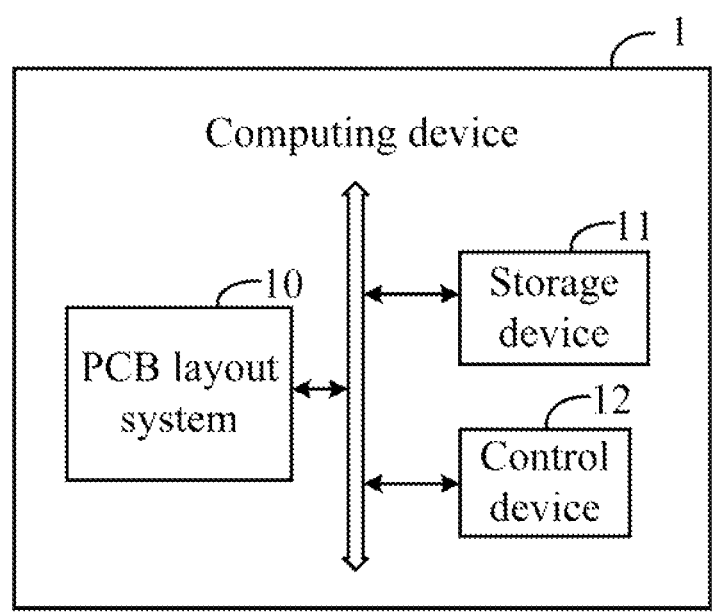
FIG. 1 is a block diagram of one example embodiment of a hardware environment for executing a printed circuit board (PCB) layout system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of one example embodiment of a hardware environment for executing a printed circuit board (PCB) layout system 10. The PCB layout system 10 is installed in and run by a computing device 1. The computing device 1 can be a personal computer or a server. The computing device 1 can include a storage device 11 and at least one control device 12.

Figure 4:
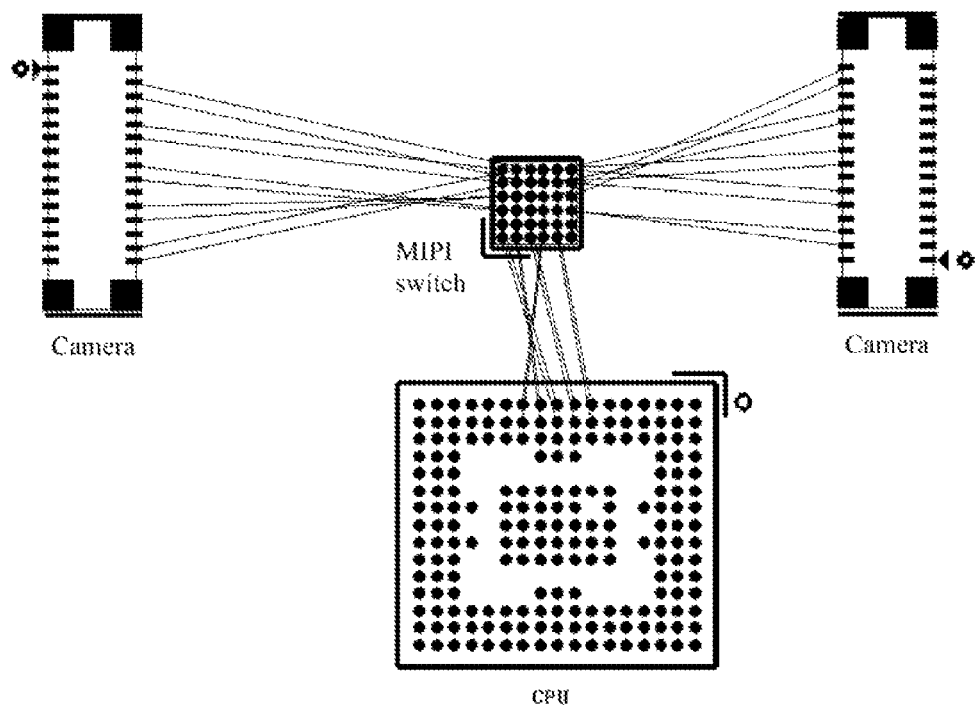
FIG. 4 illustrates one example embodiment of a T topology using a MIPI switch.

The PCB layout system 10 can include a plurality of function modules (shown in FIG. 2) that determine wiring paths of a T topology circuit on a PCB. The T topology circuit includes a first electronic component, a second electronic component, and two third electronic components. Respective positions of the first electronic component, the second electronic component, and the third electronic components on the PCB are pre-determined. The second electronic component is connected to the two third electronic components via the first electronic component in a T topology. There are multiple signal pairs between the second electronic component and the third electronic components. The wiring paths ensure that for each signal pair, wiring lengths of the signal pair (i.e., wiring lengths of a positive signal and a negative signal of the signal pair) are equal. The wiring paths further ensure that for different signal pairs, wiring lengths of the different signal pairs are also equal. In one embodiment, the first electronic component is a mobile industry processor interface (MIPI) switch. The second electronic component is a central processing unit (CPU). Each of the third electronic components is a camera. There are five differential signal pairs between the second electronic component and the third electronic components. FIG. 4 illustrates one example embodiment of the T topology.

The storage device 11 can include some type(s) of non-transitory computer-readable storage medium such as, for example, a hard disk drive, a compact disc, a digital video disc, or a tape drive. The storage device 11 stores information related to the T topology circuit, such as a schematic diagram and a netlist of the T topology circuit. The storage device 11 further stores the computerized codes of the function modules of the PCB layout system 10.

The control device 12 can be a processor, a microprocessor, an application-specific integrated circuit (ASIC), or a field programmable gate array (FPGA), for example. The control device 12 can execute computerized codes of the function modules of the PCB layout system 10 to realize the functions of the computing device 1.

Figure 2:
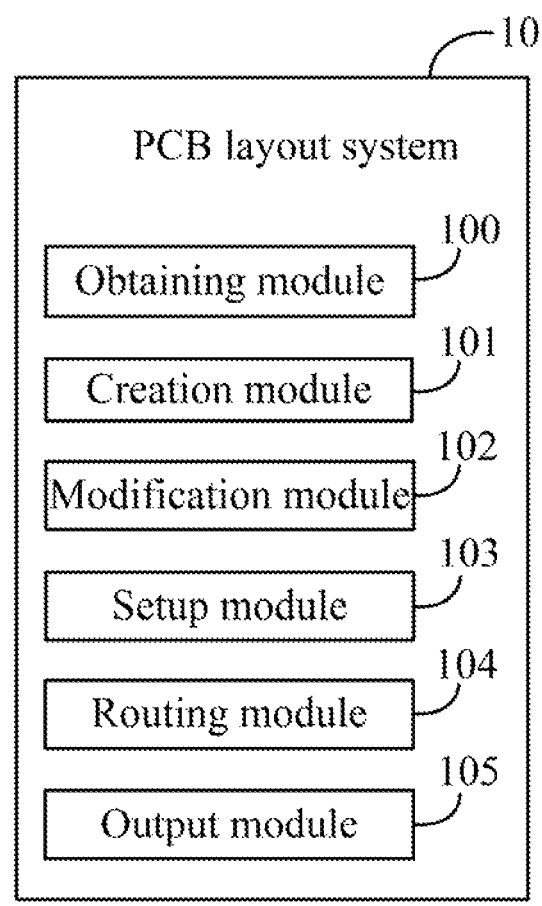
FIG. 2 is a block diagram of one example embodiment of function modules of the PCB layout system in FIG. 1.

FIG. 2 is a block diagram of one embodiment of function modules of the PCB layout system 10. The function modules can include, but are not limited to, an obtaining module 100, a creation module 101, a modification module 102, a setup module 103, a routing module 104, and an output module 105. The function modules 100-105 can include computerized codes in the form of one or more programs, which provide at least the functions of the PCB layout system 10.

The obtaining module 100 is configured to obtain pins of the first electronic component that are connected to the second electronic component or the third electronic components. For example, the obtaining module 100 obtains pins of the MIPI switch that are connected to the CPU or the cameras. The obtained pins of the MIPI switch include pins A1-A6, B1-B6, C1, C2, C5, C6, C6, D1, D2, D5, D6, E1-E6, and F3-F6. In one embodiment, the obtaining module 100 reads a pin report of the T topology circuit from the storage device 11, and obtains the pins from the pin report.

The creation module 101 is configured to create a model of the first electronic component according to the obtained pins. For example, the creation module 101 creates a model of the MIPI switch that includes the pins A1-A6, B1-B6, C1, C2, C5, C6, C6, D1, D2, D5, D6, E1-E6, and F3-F6.

The modification module 102 is configured to modify the model to form extended nets of the first electronic component. Each of the extended nets includes three nets of the T topology circuit. The three nets are interconnected through three obtained pins. One of the three obtained pins is a common pin. The common pin has a connection relationship with each of the other two obtained pins. In one embodiment, the modification module 102 forms the extended nets using a triode model.

Program codes for modifying the model can be described as follow:

```
("SA0644UC130_000_WLCSP_0D4_6x6_3_FSA644UCX"
  ("ESpice"
".subckt SA0644UC130_000_WLCSP_0D4_6x6_3_FSA644UCX A1
A2 B1 C1 D1 E1 B2 C2 D2 E2 D5 B3 D6 A3 E5 B4 F5 A6 F4 B6 F3
C6
E6 A4 F6 A5 E4 B5 E3 C5        //A1, A2, B1, C1, D1, E1, B2, C2, D2,
and E2 are common pins
R1 D5 A1  10 //establish a connection relationship between A1 and D5
R2 B3 A1  10 //establish a connection relationship between A1 and B3
R3 D6 A2  10
R4 A3 A2  10
R5 E5 B1  10
R6 B4 B1  10
R7 F5 C1  10
R8 A6 C1  10
R9 F4 D1  10
R10 B6 D1  10
R11 F3 E1  10
R12 C6 E1  10
R13 E6 B2  10
R14 A4 B2  10
R15 F6 C2  10
R16 A5 C2  10
R17 E4 D2  10
R18 B5 D2  10
R19 E3 E2  10
R20 C5 E2  10
.ends SA0644UC130_000_WLCSP_0D4_6x6_3_FSA644UCX
")
  ("PinConnections"
    ("D5" "A1")
    ("B3" "A1")
    ("D6" "A2")
    ("A3" "A2")
    ("E5" "B1")
    ("B4" "B1")
    ("F5" "C1")
    ("A6" "C1")
    ("F4" "D1")
    ("B6" "D1")
    ("F3" "E1")
    ("C6" "E1")
    ("E6" "B2")
    ("A4" "B2")
    ("F6" "C2")
    ("A5" "C2")
    ("E4" "D2")
    ("B5" "D2")
```

```
    ("E3" "E2")
    ("C5" "E2")
  )
).
```

The modification module 102 can determine whether the extended nets of the first electronic component are correct. If the extended nets are incorrect, the modification module 102 re-modifies the module.

The setup module 103 is configured to set pin pairs of the extended nets, and set match groups from the pin pairs. Each pin pair represents a pair of pins with logical connections. Each match group represents a signal pair which needs to have the same wiring lengths. For example, the setup module 103 sets two pin pairs corresponding to a differential signal pair, and sets the two pin pairs as a match group. The setup module 103 can set a pin type of each pin in the pin pairs as bidirectional.

The routing module 104 is configured to determine the wiring paths between the second electronic component and the third electronic components according to the match groups.

The output module 105 is configured to output the wiring paths between the second electronic component and the third electronic components. For example, the output module 105 displays the wiring paths on a display device of the computing device 1. In one embodiment, the output module 105 can store the wiring paths into the storage device 11.

Figure 3:
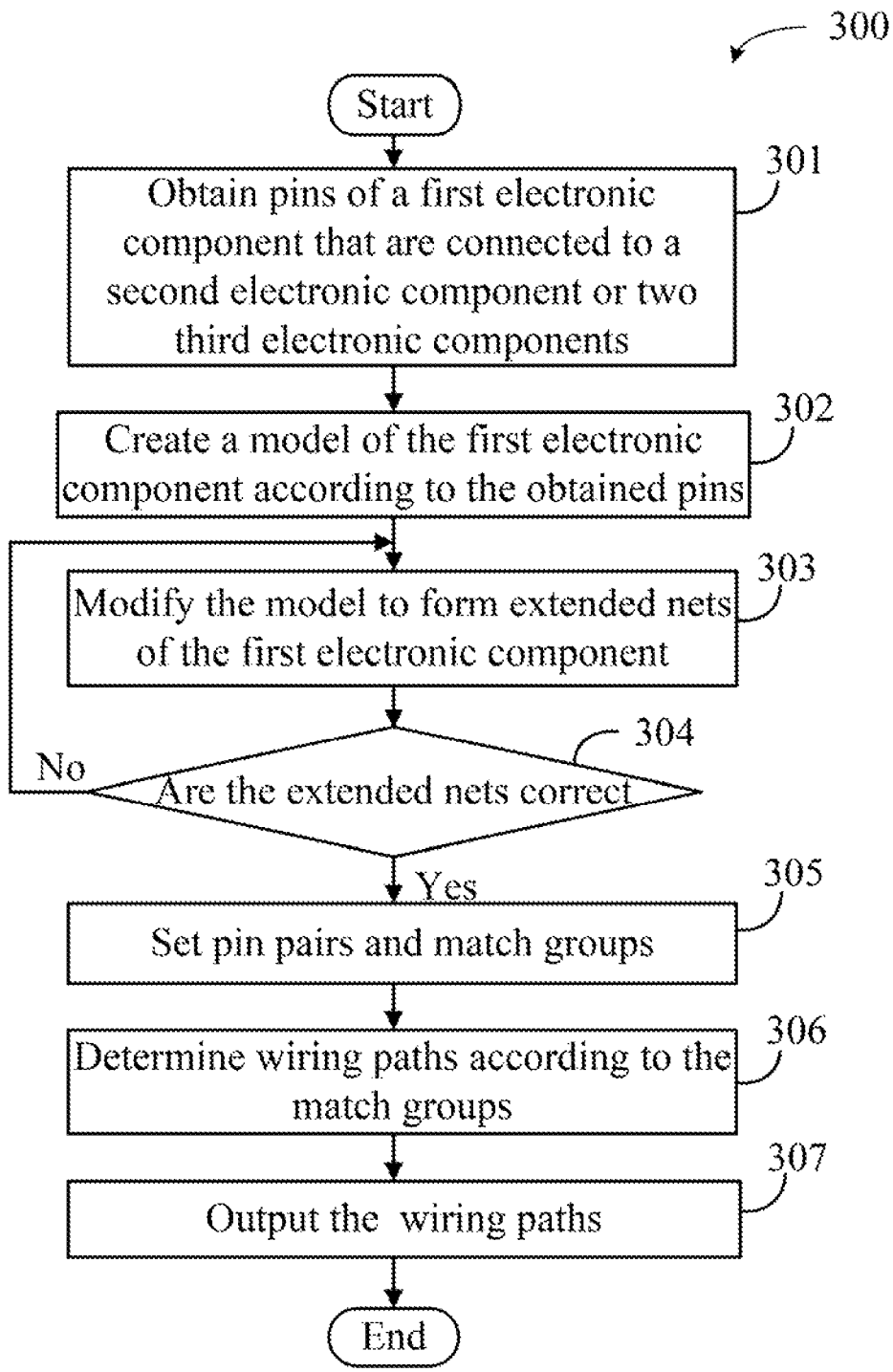
FIG. 3 is a flowchart of one example embodiment of a PCB layout method.

FIG. 3 is a flowchart of one example embodiment of a PCB layout method. In the embodiment, the method is performed by execution of computer-readable software program codes or instructions by a control device, such as at least one processor of a computing device. The PCB layout method determines wiring paths of a T topology circuit on a PCB. The T topology circuit includes a first electronic component, a second electronic component, and two third electronic components. Respective positions of the first electronic component, the second electronic component, and the third electronic components on the PCB are pre-determined. The second electronic component is connected to the third electronic components via the first electronic component with a T topology. There are multiple signal pairs between the second electronic component and the third electronic components. In one embodiment, the first electronic component is a mobile industry processor interface (MIPI) switch. The second electronic component is a central processing unit (CPU). The third electronic components are cameras. There are five differential signal pairs between the second electronic component and the third electronic components.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1-2, for example, and various elements of these figures are referenced in explaining method 300. Each block shown in FIG. 3 represents one or more processes, methods, or subroutines, carried out in the method 300. Furthermore, the illustrated order of blocks is illustrative only and the order of the blocks can be changed. Additional blocks can be added or fewer blocks may be utilized without departing from this disclosure. The method 300 can begin at block 301.

At block 301, an obtaining module obtains pins of the first electronic component that are connected to the second electronic component or the third electronic components. For example, the obtaining module obtains pins of the MIPI switch that are connected to the CPU or the cameras. The obtained pins of the MIPI switch include pins A1-A6, B1-B6, C1, C2, C5, C6, C6, D1, D2, D5, D6, E1-E6, and F3-F6. In one embodiment, the obtaining module reads a pin report of the T topology circuit from a storage device of the computing device, and obtains the pins from the pin report.

At block 302, a creation module creates a model of the first electronic component according to the obtained pins. For example, the creation module creates a model of the MIPI switch that includes the pins A1-A6, B1-B6, C1, C2, C5, C6, C6, D1, D2, D5, D6, E1-E6, and F3-F6.

At block 303, a modification module modifies the model to form extended nets of the first electronic component. Each of the extended nets includes three nets of the T topology circuit. The three nets are interconnected through three obtained pins. One of the three obtained pins is a common pin. The common pin has a connection relationship with each of the other two obtained pins. In one embodiment, the modification module forms the extended nets using a triode model.

At block 304, the modification module determines whether the extended nets of the first electronic component are correct. If the extended nets are incorrect, the process returns to block 303.

If the extended nets of the first electronic component are correct, at block 305, a setup module sets pin pairs of the extended nets, and sets match groups from the pin pairs. Each pin pair represents a pair of pins with logical connections. Each match group represents a signal pair which needs to have the same wiring length. For example, the setup module sets two pin pairs corresponding to a differential signal pair, and sets the two pin pairs as a match group. The setup module can set a pin type of each pin in the pin pairs as bidirectional.

At block 306, a routing module determines the wiring paths between the second electronic component and the third electronic components according to the match groups.

At block 307, an output module outputs the wiring paths between the second electronic component and the third electronic components. For example, the output module displays the wiring paths on a display device of the computing device. In one embodiment, the output module can store the wiring paths into the storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size, and arrangement of parts within the principles of the present disclosure, up to and including the full extent established by the broad general meaning of the terms used in the claims.

What is claimed is:

1. A method for determining wiring paths on a printed circuit board (PCB) executable by a control device of a computing device, the PCB comprising a T topology circuit, the T topology circuit comprising a first electronic component, a second electronic component, and two third electronic components, the second electronic component connected to the third electronic components via the first electronic component with a T topology, the method comprising:

obtaining pins of the first electronic component that are connected to the second electronic component or the third electronic components;

creating a model of the first electronic component according to the obtained pins;

modifying the model to form extended nets of the first electronic component, wherein each of the extended nets comprises three nets of the T topology circuit that are interconnected through three obtained pins, wherein the three obtained pins comprise a common pin that has a connection relationships with each of the other two of the three obtained pins;

setting pin pairs of the extended nets;

setting match groups from the pin pairs;

determining the wiring paths according to the match groups; and outputting the wiring paths to an output device.

2. The method according to claim 1, wherein the extended nets are formed using a triode model.

3. The method according to claim 1, wherein the first electronic component is a mobile industry processor interface (MIPI) switch, the second electronic component is a central processing unit (CPU), and the third electronic components are cameras.

4. The method according to claim 1, further comprising: setting a pin type of each pin in the pin pairs as bidirectional.

5. A computing device comprising:

a control device; and a storage device storing one or more programs which when executed by the control device, causes the control device to perform operations comprising:

obtaining pins of a first electronic component that are connected to a second electronic component or third electronic components, wherein the first electronic component, the second electronic component, and the third electronic components are comprised in a T topology circuit, and the second electronic component connected to the third electronic components via the first electronic component with a T topology;

creating a model of the first electronic component according to the obtained pins;

modifying the model to form extended nets of the first electronic component, wherein each of the extended nets comprises three nets of the T topology circuit that are interconnected through three obtained pins, wherein the three obtained pins comprise a common pin that has a connection relationships with each of the other two of the three obtained pins;

setting pin pairs of the extended nets;

setting match groups from the pin pairs;

determining the wiring paths according to the match groups; and outputting the wiring paths to an output device.

6. The computing device according to claim 5, wherein the extended nets are formed using a triode model.

7. The computing device according to claim 5, wherein the first electronic component is a mobile industry processor interface (MIPI) switch, the second electronic component is a central processing unit (CPU), and the third electronic components are cameras.

8. The computing device according to claim 5, wherein the operations further comprise:

setting a pin type of each pin in the pin pairs as bidirectional.

9. A non-transitory storage medium having stored thereon instructions that, when executed by a control device of a computing device, causes the control device to perform a method for determining wiring paths on a printed circuit board (PCB) executable by a control device of a computing device, the PCB comprising a T topology circuit, the T topology circuit comprising a first electronic component, a second electronic component, and two third electronic components, the second electronic component connected to the third electronic components via the first electronic component with a T topology, the method comprising:

obtaining pins of the first electronic component that are connected to the second electronic component or the third electronic components;

creating a model of the first electronic component according to the obtained pins;

modifying the model to form extended nets of the first electronic component, wherein each of the extended nets comprises three nets of the T topology circuit that are interconnected through three obtained pins, wherein the three obtained pins comprise a common pin that has a connection relationships with each of the other two of the three obtained pins;

setting pin pairs of the extended nets;

setting match groups from the pin pairs;

determining the wiring paths according to the match groups; and outputting the wiring paths to an output device.

10. The non-transitory storage medium according to claim 9, wherein the extended nets are formed using a triode model.

11. The non-transitory storage medium according to claim 9, wherein the first electronic component is a mobile industry processor interface (MIPI) switch, the second electronic component is a central processing unit (CPU), and the third electronic components are cameras.

12. The non-transitory storage medium according to claim 9, wherein the method further comprises:

setting a pin type of each pin in the pin pairs as bidirectional.

\* \* \* \* \*